Oct. 27, 1959  G. E. KEEFER  2,910,196
APPARATUS FOR BLANKET CHARGING GLASS BATCH
IN A GLASS FURNACE
Original Filed Oct. 15, 1957  5 Sheets-Sheet 1

Inventor
GEORGE E. KEEFER
By J. R. Nelson &
Leonard D. Saulnier
Attorneys

Oct. 27, 1959                G. E. KEEFER                2,910,196
           APPARATUS FOR BLANKET CHARGING GLASS BATCH
                        IN A GLASS FURNACE
Original Filed Oct. 15, 1957                        5 Sheets-Sheet 2
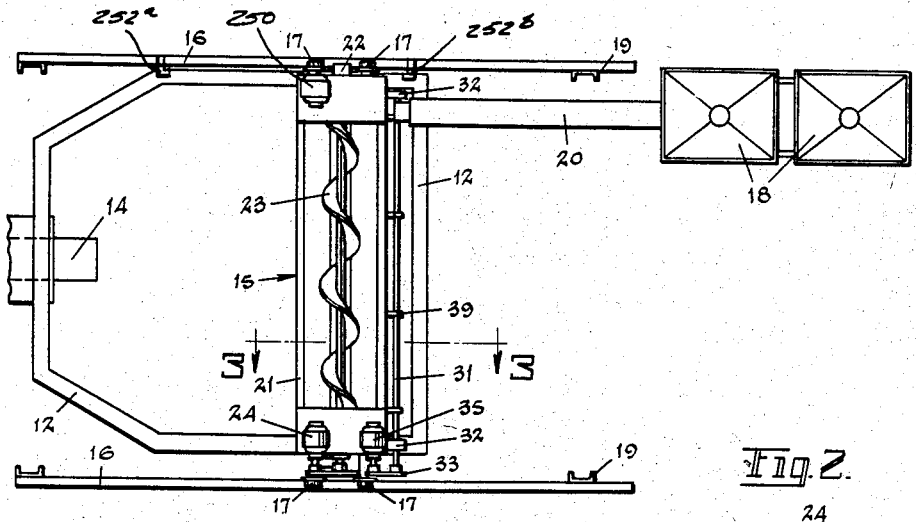
Fig. 2.
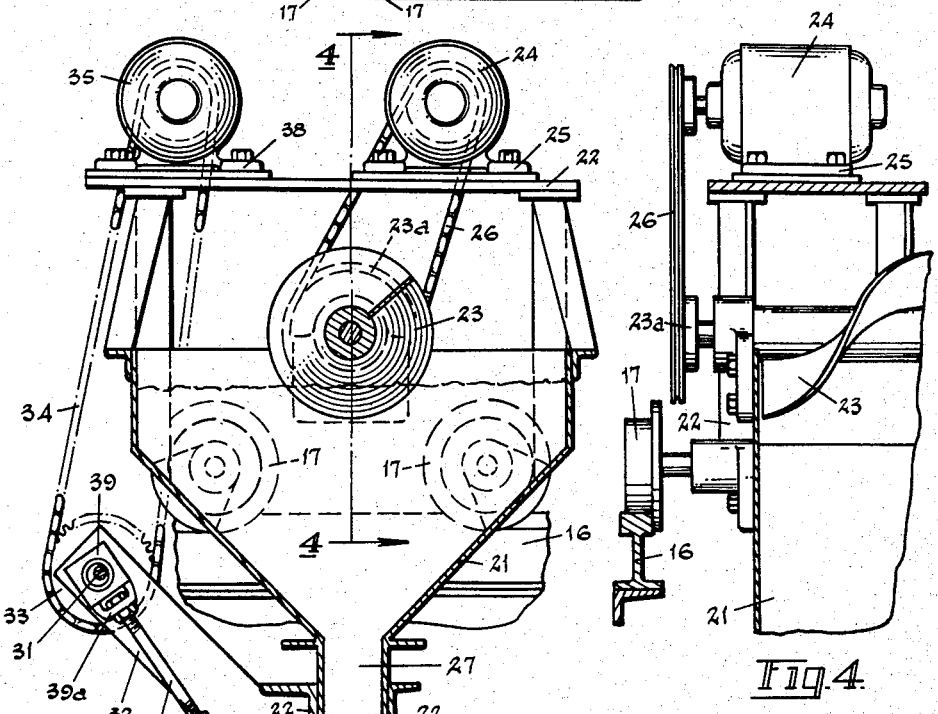
Fig. 3.          Fig. 4.
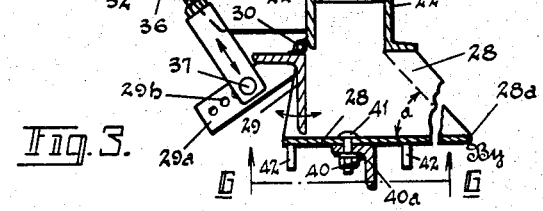
Inventor
GEORGE E. KEEFER Oct. 27, 1959 G. E. KEEFER 2,910,196
APPARATUS FOR BLANKET CHARGING GLASS BATCH
IN A GLASS FURNACE
Original Filed Oct. 15, 1957 5 Sheets-Sheet 4

Inventor
GEORGE E. KEEFER
By J. R. Nelson &
Leonard D. Laukien
Attorneys.

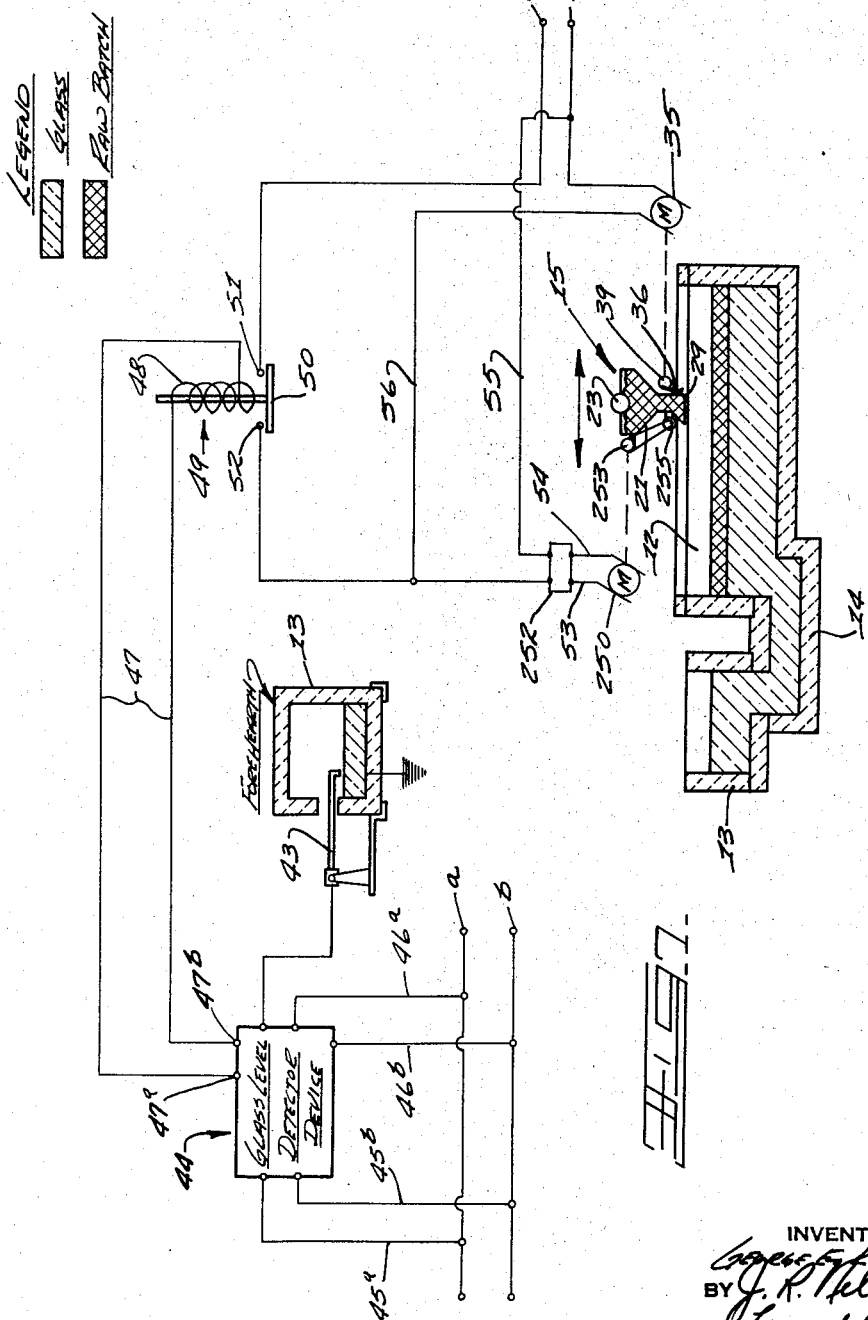

United States Patent Office 2,910,196
Patented Oct. 27, 1959

2,910,196

APPARATUS FOR BLANKET CHARGING GLASS BATCH IN A GLASS FURNACE

George E. Keefer, Toledo, Ohio, assignor to Owens-Illinois Glass Company, a corporation of Ohio Original application October 15, 1957, Serial No. 690,252. Divided and this application September 25, 1958, Serial No. 763,320

4 Claims. (Cl. 214—18.2)

This invention relates to a novel form of batch feeder apparatus utilized in blanket charging raw batch materials in a glass furnace; and more specifically, to apparatus for charging a level blanket of batch materials over the top of an electric open-top glass melting furnace.

The present application is a division of my copending continuation-in-part application Serial No. 690,252 filed October 15, 1957.

In the conventional electric glass melting furnace or tank, a melter chamber is connected to a refiner chamber by a throat passage. Molten glass is fed to forming machines from the refiner chamber through one or more feeder boots or forehearths. The glass batch is spread over the top surface of the molten glass contained in the melter in the form of a heat retaining blanket covering the molten glass body. Heat is applied to the molten glass body by electrical resistance heating. The heat of the liquid body melts the adjacent portion of the batch blanket to maintain the necessary operating level of molten glass in the furnace.

The levels of molten glass contained in the refiner and adjoining feeder boots are equal, however, due to the hydraulic-piston effect of the batch blanket on the liquid body of glass in the melter, the liquid level of the glass in the melter is below that in the refiner. These separate levels of glass throughout the furnace will vary depending upon the amount of the batch that is being supported by the molten body in the melter.

The working glass is discharged at a feeder orifice located below the level of glass in the feeder boot. The rate of discharge of the working glass determines the volume of glass in each working charge or gob and is determined by the viscosity and fluid head of the glass in the feeder. Therefore, the size of the working charge of glass issued from the discharge orifice is regulated, for a given viscosity, by the level of glass maintained in the feeder. Since this critical level of glass in the feeder is dependent upon the depth of the blanket of batch existing in the melter chamber, the desired rate of discharge of the molten glass to the forming machinery for manufacture of commercial ware is dependent upon the rate at which batch is charged to said blanket.

Previously, batch feeder devices have employed a gravity-discharge type feeding hopper which extends across one dimension of the open-top of a furnace and made to move back and forth along the other dimension of the melter, discharging its batch contents during travel. The hopper must necessarily be recharged with batch material at some point during the back and forth travel and for this purpose its movement is interrupted periodically. During filling of the hopper, as well as all other times, the batch materials are supported by the batch blanket.

Several disadvantages are inherent in the use of such a gravity-feed hopper, namely: (1) A small area of the batch blanket must have sufficient supporting strength to hold most of the weight of the batch in the hopper while the device is kept stationary, and if the batch blanket yields under this weight, a large portion of the hopper load may break through at that area of the batch blanket, causing an immediate rise in the level of glass in the feeder and an increase in the size of the working charges of glass being fed to the forming machinery; (2) more batch is often fed than is required, and thus, the glass level in the furnace cannot be accurately controlled; (3) more batch is often fed over one part of the blanket than another; and (4) movement of the hopper may cause movement of the batch blanket and the glass under it.

To remedy one or more of the above disadvantages, water is sometimes added to the batch blanket to add to its strength and stability. This is undesirable due to the resultant formation of gases within the batch, which may permeate to the glass body in the melter.

The characteristic temperature differential and melting rate between the areas adjacent the vertical walls of the melter and the central melting zone causes the batch materials of the blanket to melt more rapidly near the central melting zone than near the walls of the melter. Consequently, the need for batch is greatest at the horizontal central portion of the melter.

It is, therefore, an object of this invention to provide apparatus for blanket charging glass batch over the top of a glass melter which will overcome the above disadvantages.

Another object of this invention is to provide apparatus for blanket charging glass batch over the top of a glass melter including a control responsive as a function of the melting demands of the furnace and, in so doing will maintain a level surface layer of batch in the melter.

Another object of the invention is to provide apparatus for blanket charging batch to an open-top glass melter, whereby the rate of feeding batch is variable across one dimension of the melter to compensate for the non-uniform melt of batch between the central zone of the melter and its side zones along that dimension.

A further object of the invention is the provision of apparatus for feeding batch to an open top furnace in the fashion of a top blanket overlying the molten glass undergoing melting, and wherein the batch laying rate is variable transversely of the furnace and batch is added to this blanket responsive to demands therefore, as indicated by variation in operating level of the molten glass in the furnace.

The specific nature of the invention, as well as other objects and advantages thereof, will become apparent to those skilled in the art from the following detailed description, taken in conjunction with the annexed sheets of drawings, on which, by way of preferred example only, is illustrated an embodiment of this invention.

In the drawings:

Fig. 2 is a plan view of the batch feeder apparatus, shown in operating position over the top of the glass melter.

Fig. 3 is an end view of the apparatus taken along lines 3—3 of Fig. 5.

Fig. 4 is a fragmentary sectional view taken along lines 4—4 of Fig. 3.

Fig. 7 is a schematic view, showing the electrical control device and control circuits for operating the discharge assistants and moving the batch feeding hopper along one dimension of the furnace responsive to the demand of the furnace.

The method of this invention consists, basically, in supporting a body of batch materials by a feeder hopper supported to extend across one dimension of the open-top furnace; moving that body of batch back and forth across the other dimension of the furnace as batch is needed; feeding the batch from the hopper at a rate variable at will while moving it along said other furnace dimension to deposit a blanket of batch over the top of the glass in the furnace; and controlling the total rate of feeding the batch responsive to the furnace demand.

Figure 1:
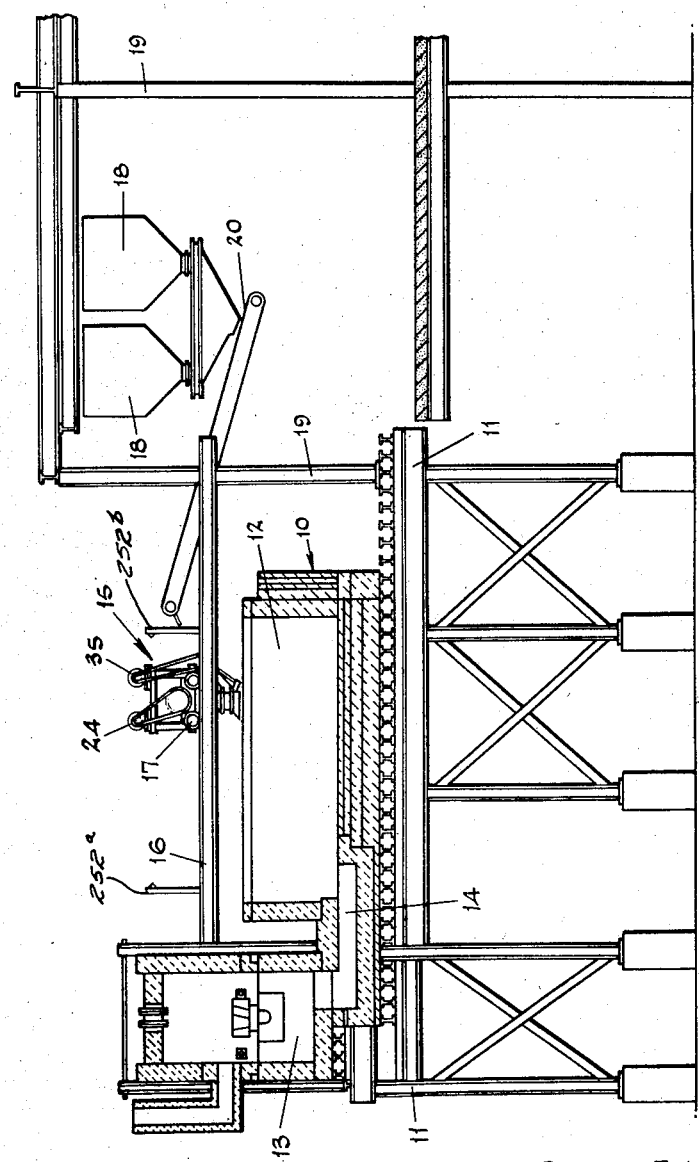
Fig. 1 is a side elevational view of a glass melting furnace to which the batch feeder apparatus and method of this invention are applied.

Fig. 1 illustrates a standard glass furnace, referred to generally at 10, supported on a structural base 11, and comprises a melter chamber 12 communicating with a refiner chamber 13 through a throat passage 14. A feeder hopper assembly 15 is supported on tracks 16 over the top of melter 12 and assembly 15 is adapted for movement longitudinally of melter 12 on rollers 17 traveling along tracks 16. Rollers 17 are propelled along tracks 16 by a conventional constant speed device (not shown) which reverses direction at each longitudinal end of melter 12. It is timed to stop or dwell periodically at the end of melter 12 opposite throat passage 14 and there load the hopper of assembly 15 with a fresh supply of batch. Spaced from the outer end wall of melter 12 are batch bins 18 supported on structural columns 19. Bins 18 are utilized to store raw batch materials for transfer to feeder hopper assembly 15 by conveyor 20. The hopper of assembly 15 is loaded while stationary at its extremity of travel to the right hand side of Fig. 1.

Referring now to Figs. 2–5, it is seen that the feeder hopper assembly 15 comprises an elongated funnel-shaped hopper 21 supported by a frame 22 mounted on rollers 17. Longitudinally of the hopper 21 is a screw element 23 mounted for rotation therein. An electric motor 24 is mounted on a bracket 25 at one end of hopper frame 22, and drives screw 23 through belt 26 and pulley 23a (Fig. 4) to distribute the batch uniformly throughout the length of hopper 21.

The hopper 21 is propelled by reversible electric motor 250 mounted at one top side of hopper 21 on bracket 251. Motor 250 has a driving connection to the shaft mounting one set of the rollers 17, as will be presently described.

Motor 250 is provided with a reversible switch 252 (Fig. 5) that may be actuated by engagement with aligned stationary members 252a and 252b (Fig. 1) at either end of the travel of hopper 21 along rail 16. This arrangement or any other convenient and well-known arrangement may be used to provide a means for reversing the travel of hopper 21, and in so doing define the operating span of travel of said hopper across the open top of the furnace.

Figure 5:
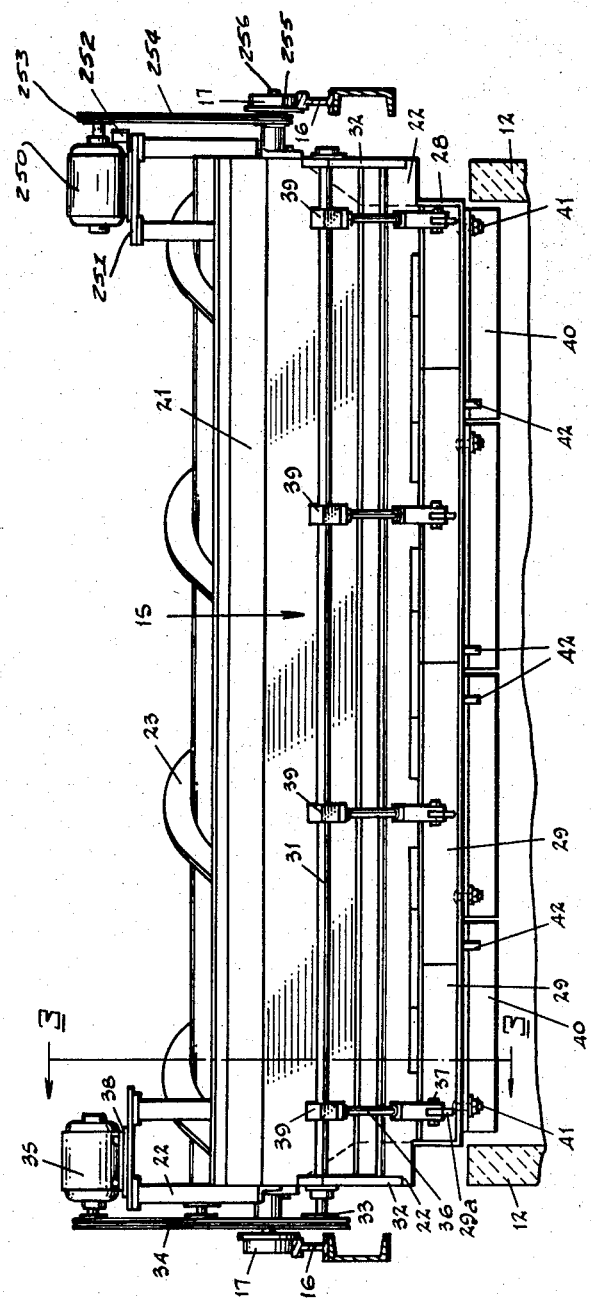
Fig. 5 is a rear elevational view of the batch feeder apparatus of this invention.

Referring briefly to Fig. 5, the motor 250 is mounted on its mounting bracket 251. Its drive pulley 253 makes a driving connection with pulley 255 keyed on shaft 256 for one set of the rollers 17 and transmits rotation to shaft 256 and rollers 17 thereon through drive chain belt 254.

The lower funnel portion of hopper 21 (Fig. 3) is housed between longitudinal members of frame 22 and has a discharge opening 27 to permit gravity feeding of batch material contained in hopper 21 onto an elongated discharge lip member 28 rigidly mounted on frame 22 below discharge opening 27. Discharge lip member 28 receives and supports batch material in hopper 21 and has sufficient width (Fig. 3) so that, as batch material is discharged from hopper 21 onto lip 28, the angle of repose of the batch supported thereon (angle a) will prevent the batch from spilling over the discharge extremity 28a of lip member 28. Along the one longitudinal edge of lip member 28 is mounted a plurality of discharge assistants for moving batch off of lip member 28. As shown, these discharge assistants are illustrated as a plurality of reciprocating blade elements 29 pivoted about a longitudinal pivot axis 30 overlying lip member 28 and along the side of the lower end of discharge opening 27 of hopper 21. A lever arm extension 29a is provided integral on each of blade members 29 and extends outwardly of opening 27. Shaft 31 is journaled at its ends in brackets 32 mounted on hopper frame 22 so that it is parallel to and overlying blade members 29. Pulley 33 is keyed to the end of shaft 31 for imparting rotation transmitted from a variable speed motor 35 and belt 34. Motor 35 is mounted on frame 22 by bracket 38. The variable speed feature of motor 35 is utilized to vary, at will, the total feeding rate of the discharge assistants. A plurality of connecting rods 36 are each pivoted at one end on pins 37 in their respective lever arms 29a of blade members 29 at pins 37. Pins 37 are carried in selected hole 29b of a series of such holes along each lever arm 29a, and are readily removable for adjusting the connection of connecting rod 36 to lever arm 29a. Adjacent the other end of connecting rod 36 is provided an eccentric journal member 39 clamped about shaft 31 and journaled into a bearing assembly 39a. The end of connecting rod 36 is threaded onto the U-shaped bracket portion of bearing assembly 39a. Connecting rod 36 has a threaded adjustment to adjust its length when changing the lower connection to lever arm 29a between holes 29b. Likewise, the throw of the eccentrics are adjustable by providing eccentric journal members 39 of various radii, which are assembled in split fashion and easily changed after unscrewing rod 36 from U-shaped bracket 39a.

During operation of the feeder hopper assembly 15, motor 35 drives shaft 31 in one direction. The rotation at shaft 31 is converted to reciprocal motion at blade member 29 through the action of eccentric 39 and connecting rod 36 on lever arm 29a. The length of stroke of the reciprocating motion of a given blade member 29 is adjustable by varying its point of connection to connecting rod 36 along the length of its lever arm 29a or by changing the throw of eccentric 39, or both.

In the figures is shown an arrangement of four driving connections 39, 36 and 37 for reciprocating blade members 29. It is contemplated by this invention that the centrally located blade members 29 be reciprocated through a longer stroke motion than the two outer members 29, thereby varying their effective rate of discharging batch material from lip member 28. This variation is adjustable to compensate for the increased demand for batch in the central zone of the melter.

This invention also contemplates placing eccentrics 39 on shaft 31 such that they are out of phase one with the other (90 degrees successively out of phase is preferred where four blade members are used) in order to equalize and reduce the driving load placed on motor 35 during rotational driving cycles of shaft 31, and additionally, to lessen bearing load on shaft 31, thereby prolonging the life of the supporting bearings.

Figure 6:
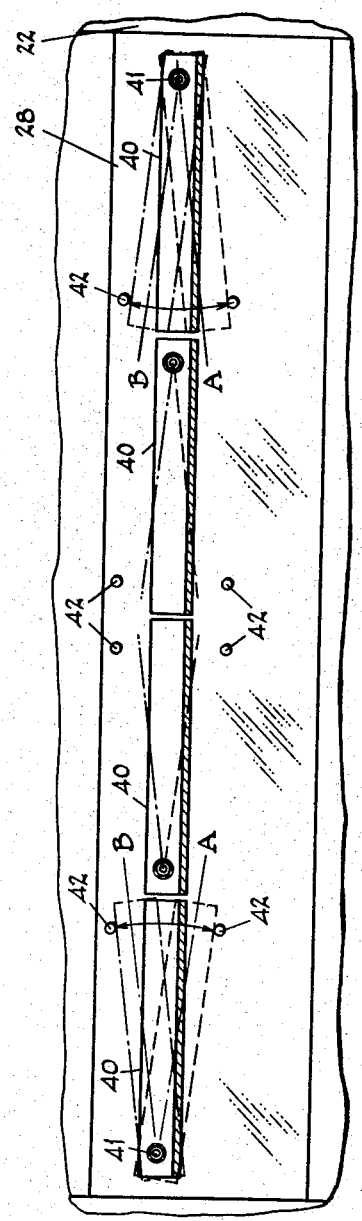
Fig. 6 is a bottom view of the discharge plate of the feeder apparatus taken along line 6—6 of Fig. 3, showing the positioning of the batch grader elements.

Referring to Figs. 3, 5 and 6, a plurality of angle-shaped elongated grader members 40 with a vertically projecting blade 40a are pivoted in a horizontal plane about vertical pins 14 extending through discharge lip member 28. Pins 41 lie longitudinally in line along lip member 28, so that the grader members 40 are pivoted nearer their outwardly extending ends (Fig. 6). Such arrangement of four grader members 40 are shown on the drawings, but any number may be provided as may prove most convenient. The grader members 40 are free to pivot in either direction between the limits defined by projecting lugs 42 longitudinally spaced along a line on either side of pivot pins 41, so that, when the feeder hopper assembly 15 moves toward throat passage 14 (to the right in Fig. 3 and upwardly in Fig. 6), the respective grader members 40 pivot away from the linear direction of travel of hopper assembly 15. Thus, in Fig. 6, as the grader elements come in contact with piles of bath during travel of hopper assembly 15, the grader members 40 pivoted on the left side of discharge lip member 28 will angle clockwise from their pivot pins 41 and grader members 40 on the right side of said member 28 will angle counterclockwise from their pivot pins 41 until each respective blade member 40 engages its respective lug 42. Thusly, any projection of batch above a predetermined level along the upper surface of the batch blanket contained in the melter will be shifted from the outer lateral portions of the batch blanket toward its central portion under the grading action of the vertically projecting blades 40a. Similarly, raised portions at the ends of the batch blanket projecting above this level will be graded centrally of the blanket to fill in the central portion. This serves to level the top layer of the batch blanket after it has been laid on the top of melter 12. This same grading effect will be obtained when the feeder hopper assembly reverses travel direction, and in which case the respective grader members will angle in the opposite direction to rest against lugs 42.

In practicing the method of this invention, feeder hopper assembly 15 is capable of being reciprocally moved back and forth across one dimension of the furnace. During this movement, motor 35 imparts reciprocating motion to blade members 29 to move batch material deposited on discharge lip member 28 over its discharge extremity 28a and lay a curtain of batch over the top of the melter. Along the length of discharge lip member 28 these discharge assistants (blade members 29) are feeding batch at a varying rate due to the variation in the length of reciprocating stroke of blade members 29. This variation in discharge rate is adjustable to compensate for the greater melting rate of batch near the central zone of the melter. By the adjustments described above, the discharge rate of batch from the feeder apparatus may be varied from one end of the discharge lip to the other to lay a curtain of batch on a level top surface transversely of the blanket in the melter. Also, the grader members cooperate to further level the batch blanket in the melter.

Also contemplated in this invention is a means of controlling the aforementioned variable rate of laying batch over the melter responsive to furnace demand by, at will, varying the speed of motor 35 used to drive the discharge assistants (29), so that the total rate of feeding batch from the feeder hopper may be controlled.

This variable speed motor control is shown schematically in Fig. 7. Additionally, a conventional glass level probe 43 is mounted in the furnace forehearth and connected electrically to a glass level detector device 44 of the type shown and described in U.S. Patent No. 2,613,443 to M. A. Helmick, entitled "Glass Level Recording Mechanism." Power is applied to detector device 44 from the main lines of an alternating current system a and b connected by leads 45a and 45b, and 46a and 46b. Terminals 47a and 47b of detector device 44 is shown connected to complete a circuit 47 through coil 48 of electromagnetic relay. The circuit 47 when closed in detector device 44 energizes coil 48 and actuates the circuit closing device 50 of relay 49 to interconnect its contacts 51 and 52. Contact 51 is connected to terminal a' of a main line power source. Contact 52 is connected to the one side of reversible switch 252 in the power circuit of motor 250. The other terminal of switch 252 is connected to the other terminal b' of the main line by lead 55 to complete the circuit. Reversing switch 252 by the connections at 53 and 54 establishes a power circuit for running reversible motor 250 in either direction. Motor 250, when energized, propels hopper 21 in reciprocable fashion along one dimension of melter 10, as previously described.

Power is applied to motor 35 from terminal b' of the main line. The other side of motor 35 is connected to contact 52 of relay 49 by line 56. When contacts 51 and 52 are closed by actuation of the circuit closing device 50 of relay 49, the power circuit for motor 35 is established and it drives the discharge assistants 29 collectively, as previously described.

Thus, as the demands of the furnace increase, as measured by a level of glass in the feeder forehearth of the furnace being too low, the glass level detector device 44 closes the circuit to relay coil 48, which is actuated to close the power circuits and start both motors 250 and 35, thereby propelling hopper 21 along the furnace in the appropriate direction and actuating the discharge assistants (29) until the glass level in the forehearth returns to normal. At this point, the glass level detector device 44 cuts out the relay, brakes the relay circuit 47 and de-energizes relay 49, thereby stopping both motors 250 and 35. The hopper 21 will thus remain in a stationary position and will feed no further batch from it until the glass level detector device detects a further need for batch materials by the furnace due to its forehearth glass level dropping below the desired established normal operating level. When this occurs the relay circuit 47 is again established to start the motors 250 and 35.

If the glass level in the forehearth rises too high, glass level detector device 44 maintains relay circuit 47 open and relay 49 remains de-energized. No further batch is fed by the hopper 21, because motors 250 and 35 remain stopped.

It will, of course, be understood that various details of construction and operation may be modified through a wide range without departing from the principles of this invention, and it is, therefore, not the purpose to limit the patent granted hereon otherwise than necessitated by the scope of the appended claims.

I claim:

1. In a batch feeder system for a glass furnace having a hopper extending across the top of said furnace, and including means at the bottom of said hopper defining an elongated discharge opening extending across one dimension of said furnace, means mounting said hopper for movement along the other dimension of said furnace, a plurality of movable discharge assistants cooperating with said discharge opening to control the feed of batch therethrough, the combination therewith of: motor driven means for moving said hopper longitudinally along the top of the furnace, said means including an electric drive motor, a variable speed electric drive motor operatively connected to actuate said discharge assistants, and motor control means in circuit with both electric drive motors for simultaneously energizing them responsive to demands of the furnace for batch, said last-mentioned means comprising an electrically operated glass level gauge operatively connected to detect the glass level in the furnace forehearth, a normally open circuit-closing device in circuit with each power circuit for said motors, and electro-responsive means in circuit with the glass level gauge and actuable responsible to furnace glass levels detected by said gauge that are below predetermined normal operating levels to close said circuit closing device, thereby energizing both said drive motors simultaneously.

2. The combination defined in claim 1, wherein the circuit-closing device comprises an electromagnetic relay actuable to close the power circuits to each electric drive motor, the coil of said relay being in circuit with the glass level gauge and energized responsive to glass levels in the furnace forehearth below the predetermined normal operating level.

3. In a batch feeder system for a glass furnace having a hopper extending across the top of said furnace, and including means at the bottom of said hopper defining an elongated discharge opening extending through the major portion of one dimension of said furnace, means mounting said hopper for movement along the other dimension of said furnace, a plurality of movable auxiliary discharge members cooperating with said discharge opening to control the feed of batch therethrough, each of said discharge members being independently variable to determine its batch feeding effectiveness, and means for individually varying each of said discharge members to modify the batch feeding rate across said one dimension of said furnace, the combination therewith of: means for moving said hopper along the other dimension at the top of the furnace, drive means for collectively actuating said discharge members and control means cooperatively associated with said last two mentioned means for actuating said hopper and said discharge members collectively and simultaneously whenever furnace demand indicates a need for additional batch.

4. The combination defined in claim 3, wherein the drive means for the discharge members comprises a variable speed electric motor drive operable for, at will, collectively varying the batch feeding rate of all the discharge members.

No references cited.